United States Patent
Yamashita

(10) Patent No.: US 12,025,064 B2
(45) Date of Patent: Jul. 2, 2024

(54) CONTROLLER FOR HYDROGEN ENGINE

(71) Applicant: TOYOTA JIDOSHA KABUSHIKI KAISHA, Toyota (JP)

(72) Inventor: Akira Yamashita, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/493,318

(22) Filed: Oct. 24, 2023

(65) Prior Publication Data

US 2024/0175401 A1 May 30, 2024

(30) Foreign Application Priority Data

Nov. 28, 2022 (JP) .................... 2022-189062

(51) Int. Cl.
| | |
|---|---|
| *F02M 7/00* | (2006.01) |
| *F02D 13/02* | (2006.01) |
| *F02D 35/02* | (2006.01) |
| *F02D 41/00* | (2006.01) |
| *F02D 41/40* | (2006.01) |
| *F02P 5/153* | (2006.01) |

(52) U.S. Cl.
CPC ....... *F02D 35/023* (2013.01); *F02D 13/0234* (2013.01); *F02D 41/0027* (2013.01); *F02D 41/401* (2013.01); *F02P 5/153* (2013.01)

(58) Field of Classification Search
CPC ....... Y02T 10/40; Y02T 10/30; F02D 41/401; F02D 35/023; F02M 21/0206; F02M 21/0275
USPC .......................................... 123/435
See application file for complete search history.

(56) References Cited

U.S. PATENT DOCUMENTS

| | | | | |
|---|---|---|---|---|
| 2009/0012698 | A1* | 1/2009 | Shinagawa | F02B 23/0672 123/575 |
| 2009/0229541 | A1* | 9/2009 | Shimasaki | F02D 41/0025 123/304 |
| 2017/0016872 | A1* | 1/2017 | Nakasaka | G01M 15/08 |
| 2018/0274462 | A1* | 9/2018 | Ujihara | F02D 41/1456 |
| 2019/0242319 | A1* | 8/2019 | Matsumoto | G07C 5/0816 |
| 2019/0285005 | A1* | 9/2019 | Nakamura | F02D 41/04 |
| 2021/0310456 | A1* | 10/2021 | Hitomi | F02D 41/38 |

FOREIGN PATENT DOCUMENTS

JP 2012-167582 A 9/2012

* cited by examiner

*Primary Examiner* — Long T Tran
*Assistant Examiner* — James J Kim
(74) *Attorney, Agent, or Firm* — Finnegan, Henderson, Farabow, Garrett & Dunner, LLP

(57) ABSTRACT

The ECM calculates a peak value of an in-cylinder pressure before ignition based on the operating state of the hydrogen engine. When the peak value of the in-cylinder pressure before ignition exceeds a threshold value, the ECM performs an advancement correction of the ignition timing such that the peak value becomes less than or equal to the threshold value.

8 Claims, 3 Drawing Sheets

CONTROLLER FOR HYDROGEN ENGINE

1. FIELD

The present disclosure relates to a controller for a hydrogen engine.

2. DESCRIPTION OF RELATED ART

Japanese Laid-Open Patent Publication No. 2012-167582 discloses a technique related to an operating gas circulation engine that uses hydrogen gas as fuel. In this technique, the valve timing or the like is controlled such that the peak value of the combustion pressure does not exceed the upper limit value to avoid a decrease in the thermal efficiency due to an excessive increase in the in-cylinder pressure and the in-cylinder temperature.

In a hydrogen engine that uses hydrogen gas as fuel, metal components around a combustion chamber may become brittle due to permeation of hydrogen.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a controller for a hydrogen engine that uses hydrogen gas as fuel. The controller includes a processor configured to calculate a peak value of an in-cylinder pressure before ignition based on an operating state of the hydrogen engine, and, when the peak value is greater than a threshold value, change a control content of the hydrogen engine such that the peak value becomes less than or equal to the threshold value.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, apparatuses, and/or systems described. Modifications and equivalents of the modes, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Figure 1:
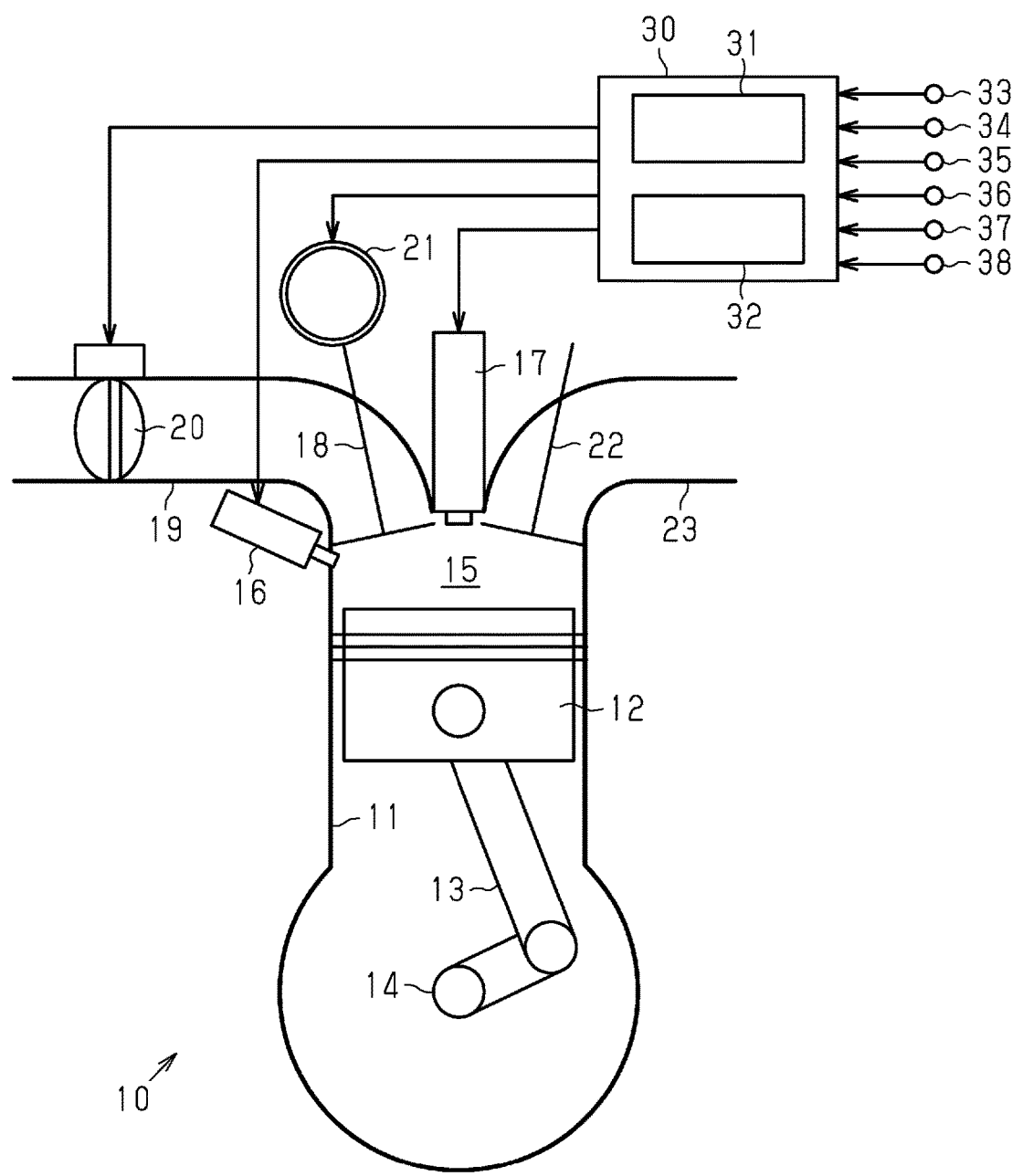
FIG. 1 is a schematic diagram showing the configuration of a controller for a hydrogen engine according to an embodiment.

A controller for a hydrogen engine according to one embodiment will now be described with reference to FIGS. 1 to 3.

Configuration of Hydrogen Engine

First, the configuration of a hydrogen engine 10 to which the controller of the present embodiment is applied will be described with reference to FIG. 1. The hydrogen engine 10 is an engine that uses hydrogen gas as fuel and is mounted on a vehicle as a drive source that generates propulsion force.

The hydrogen engine 10 includes a cylinder 11, a piston 12, a connecting rod 13, and a crankshaft 14. The piston 12 is provided to reciprocate in the cylinder 11. The piston 12 is coupled to a crankshaft 14, which is an output shaft of the hydrogen engine 10, via a connecting rod 13. The connecting rod 13 and the crankshaft 14 form a link mechanism that converts reciprocation of the piston 12 into rotation of the crankshaft 14.

Each cylinder 11 includes a combustion chamber 15 defined by an inner wall of the cylinder 11 and the piston 12. An injector 16 and an ignition device 17 are installed in the combustion chamber 15. The injector 16 injects hydrogen gas into the combustion chamber 15. The ignition device 17 ignites the air-fuel mixture of hydrogen gas and intake air with spark discharge.

The combustion chamber 15 is connected to the intake passage 19 by an intake valve 18. The intake passage 19 is a passage through which intake air is drawn into the combustion chamber 15. Intake air flows into the combustion chamber 15 from the intake passage 19 as the intake valve 18 opens. The intake passage 19 is provided with a throttle valve 20 that changes the flow passage area of intake air. The hydrogen engine 10 also includes a variable valve timing mechanism 21 that varies the timing of opening and closing the intake valve 18. In the following description, the variable valve timing mechanism 21 is referred to as a "VVT 21".

The combustion chamber 15 is connected to an exhaust passage 23 via an exhaust valve 22. The exhaust passage 23 is a discharge passage for exhaust gas generated by combustion of the air-fuel mixture in the combustion chamber 15. Exhaust gas in the combustion chamber 15 flows out to the exhaust passage 23 when the exhaust valve 22 opens.

Configuration of Controller

The configuration of a control device for the hydrogen engine 10 will now be described with reference to FIG. 1. The controller of the present embodiment is configured as an engine control module 30 including a processor 31 and a memory 32. The memory 32 stores programs and data used to control the hydrogen engine 10 in advance. The processor 31 reads programs from the memory 32 and executes the read programs. In the following description, the engine control module 30 is referred to as "the ECM 30."

The ECM 30 receives detection signals of various types of sensors that detect the operating state of the hydrogen engine 10. Such sensors include an air flow meter 33, a crank angle sensor 34, an intake air temperature sensor 35, an atmospheric pressure sensor 36, an accelerator pedal sensor 37, and a vehicle speed sensor 38. The air flow meter 33 is a sensor that detects an intake air amount GA, which is the flow rate of intake air flowing through the intake passage 19. The crank angle sensor 34 is a sensor that detects a crank angle, which is a rotational angle of the crankshaft 14. The intake air temperature sensor 35 is a sensor that detects an intake air temperature THA, which is the temperature of intake air flowing through the intake passage 19. The atmospheric pressure sensor 36 is a sensor that detects the atmospheric pressure PA. The accelerator pedal sensor 37 is a sensor that detects an accelerator pedal operation amount ACC, which is the operation amount of the accelerator pedal by the driver of the vehicle. The vehicle speed sensor 38 is a sensor that detects a vehicle speed SPD, which is the traveling speed of the vehicle. The ECM 30 calculates an engine rotation speed NE, which is the rotation speed of the crankshaft 14, based on a detection signal of the crank angle sensor 34. In addition, the ECM 30 calculates the intake air filling factor n of the combustion chamber 15 based on detection signals of the air flow meter 33 and the intake air temperature sensor 35 and the opening degree of the throttle valve 20.

The ECM 30 sets an operation amount of the hydrogen engine 10 such as the air-fuel ratio of the air-fuel mixture burned in the combustion chamber 15, the injection amount and the injection timing of hydrogen gas, the ignition timing, and the timing of opening and closing the intake valve 18. In this case, the ECM 30 sets the operation amounts to values suitable for improving the fuel economy performance and the emission performance of the hydrogen engine 10. The ECM 30 controls the hydrogen engine 10 by operating the throttle valve 20, the injector 16, the ignition device 17, and the VVT 21 based on the set operation amounts.

Hydrogen Embrittlement Limiting Control

The ECM 30 executes, as part of control of the hydrogen engine 10, a hydrogen embrittlement limiting control that limits the progress of hydrogen embrittlement in the metal component around the combustion chamber 15. Such a hydrogen embrittlement limiting control will now be described.

Figure 2:
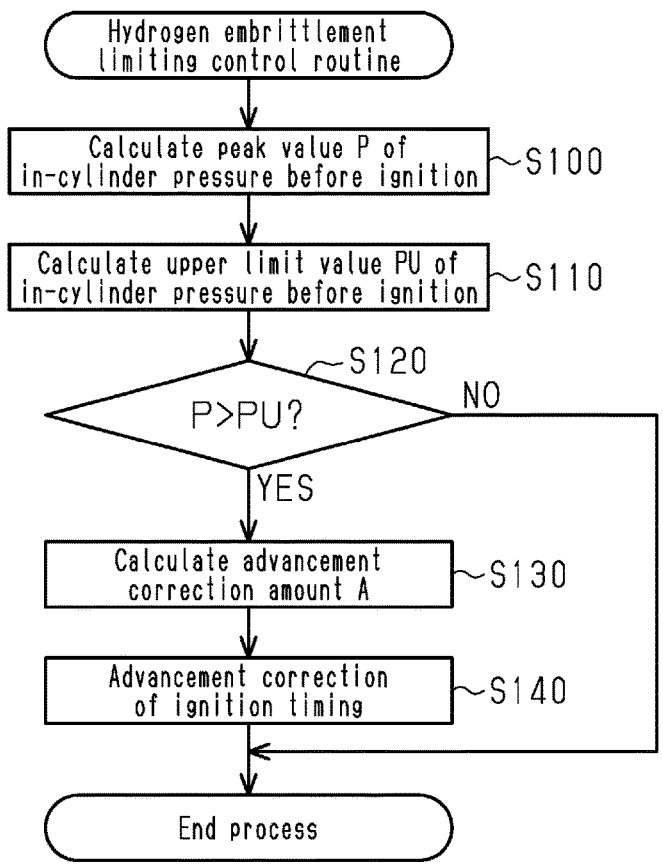
FIG. 2 is a flowchart of a hydrogen embrittlement limiting control routine executed by the controller.

FIG. 2 shows a flowchart of a hydrogen embrittlement limiting control routine executed by the ECM 30 for hydrogen embrittlement limiting control. The ECM 30 repeatedly executes this routine at each specified control cycle during the operation of the hydrogen engine 10.

When this routine is started, in step S100, the ECM 30 first calculates the peak value P of the in-cylinder pressure before ignition based on the intake air filling factor n, the intake air temperature THA, the atmospheric pressure PA, the ignition timing, the injection amount and the injection timing of the hydrogen gas, and the like. The memory 32 stores a calculation map that stores the relationship between the peak value P, which has been obtained in advance through experiments or the like, and parameters used for calculation. The ECM 30 calculates the peak value P using the calculation map.

Subsequently, in step S110, the ECM 30 calculates the upper limit value PU of the in-cylinder pressure before ignition based on the air excess ratio 2. The upper limit value PU represents the in-cylinder pressure when the hydrogen partial pressure in the combustion chamber 15 is an allowable limit value. The allowable limit value represents the upper limit of a hydrogen partial pressure capable of limiting the progress of hydrogen embrittlement of the metal component to an allowable range. Specifically, the ECM 30 calculates the hydrogen molar ratio of the air-fuel mixture in the combustion chamber 15 based on the air excess ratio 2. The ECM 30 divides the allowable limit value by the hydrogen mole fraction and calculates the value obtained by dividing the allowable limit value as the upper limit value PU.

Next, in step S120, the ECM 30 determines whether the peak value P is greater than an upper limit value PU. If the peak value P is less than or equal to the upper limit value PU (S120: NO), the ECM 30 ends the process of this routine in the current control cycle. If the peak value P is greater than the upper limit value PU (S120: YES), the ECM 30 advances the process to step S130.

In step S130, the ECM 30 calculates an advancement correction amount A of the ignition timing, which is necessary to lower the peak value P to the upper limit value PU. When the ignition timing is advanced to a point prior to the compression top dead center, the peak value P decreases. Thus, in step S130, the ECM 30 calculates the value of the advancement correction amount A such that the ignition timing is advanced to a point prior to the compression top dead center.

In the following step S140, the ECM 30 corrects the ignition timing in accordance with the advancement correction amount A. That is, the ECM 30 advances the ignition timing by an amount corresponding to the value of the advancement correction amount A. Thereafter, the ECM 30 ends the process of this routine in the current control cycle.

As a result of the advancement correction of the ignition timing at step S140, the ignition timing may be more advanced than the timing at which the injection of the injector 16 ends. Further, as a result of the advancement correction of the ignition timing in step S140, the time taken from the end of the injection to the ignition becomes short, and the mixture of hydrogen gas to the intake air may become insufficient. In such a case, in step S140, the ECM 30 also executes advancement correction of the injection timing as well as advancement correction of the ignition timing.

Operation and Advantages of Present Embodiment

The operation and advantages of the present embodiment will now be described.

In step S100 of FIG. 2, the ECM 30 calculates the peak value P of the in-cylinder pressure before ignition based on the operating state of the hydrogen engine 10. Further, in step S120 of FIG. 2, the ECM 30 determines whether the peak value P is greater than a threshold value. When the peak value P is greater than the threshold value (S120: YES), in step S140, the ECM 30 advances the ignition timing to be a point prior to the compression top dead center such that the peak value P becomes less than or equal to the upper limit value PU. That is, in step S140, the ECM 30 changes the control content of the hydrogen engine 10 such that the peak value P becomes less than or equal to the upper limit value PU. In step S110 of FIG. 2, the ECM 30 sets the upper limit value PU to the in-cylinder pressure in which the hydrogen partial pressure in the combustion chamber 15 is a specified allowable upper limit value. In the present embodiment, the upper limit value PU corresponds to the threshold value.

Figure 3:
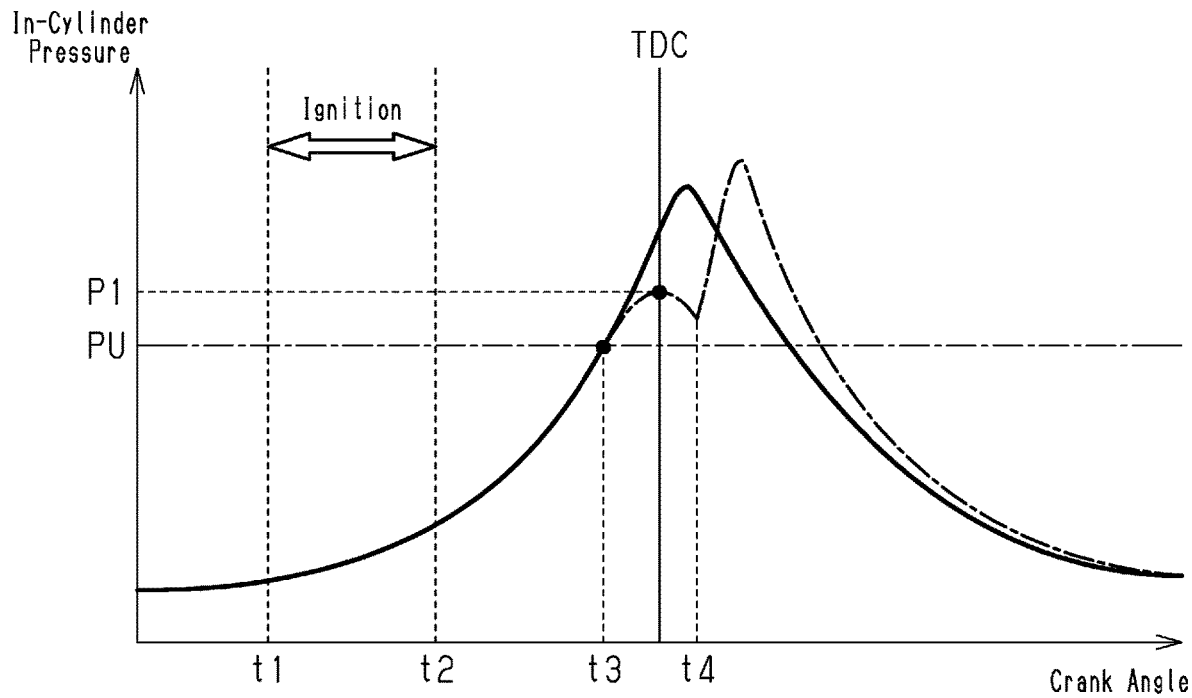
FIG. 3 is a graph showing changes in the in-cylinder pressure between a case in which the hydrogen embrittlement limiting control is executed and a case in which the control is not executed.
Figure 4:
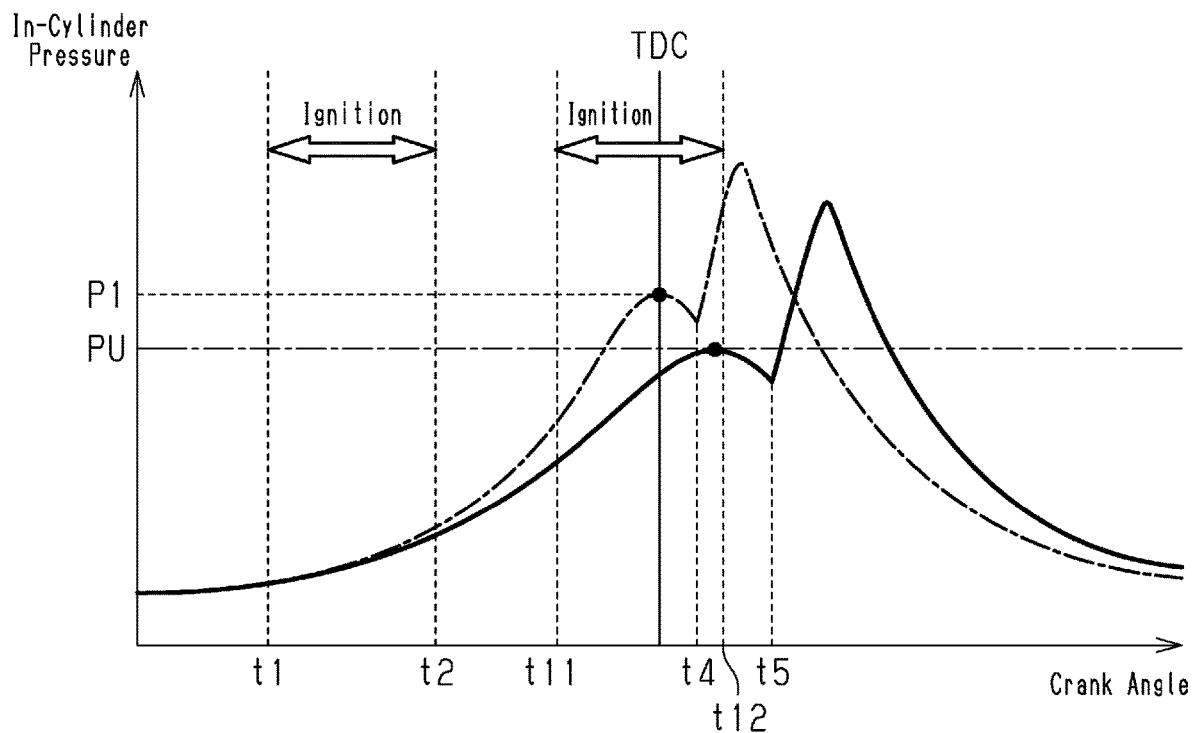
FIG. 4 is a graph showing changes in the in-cylinder pressure between a case in which the fuel injection timing is retarded and a case in which the fuel injection timing is not retarded.
Figure 5:
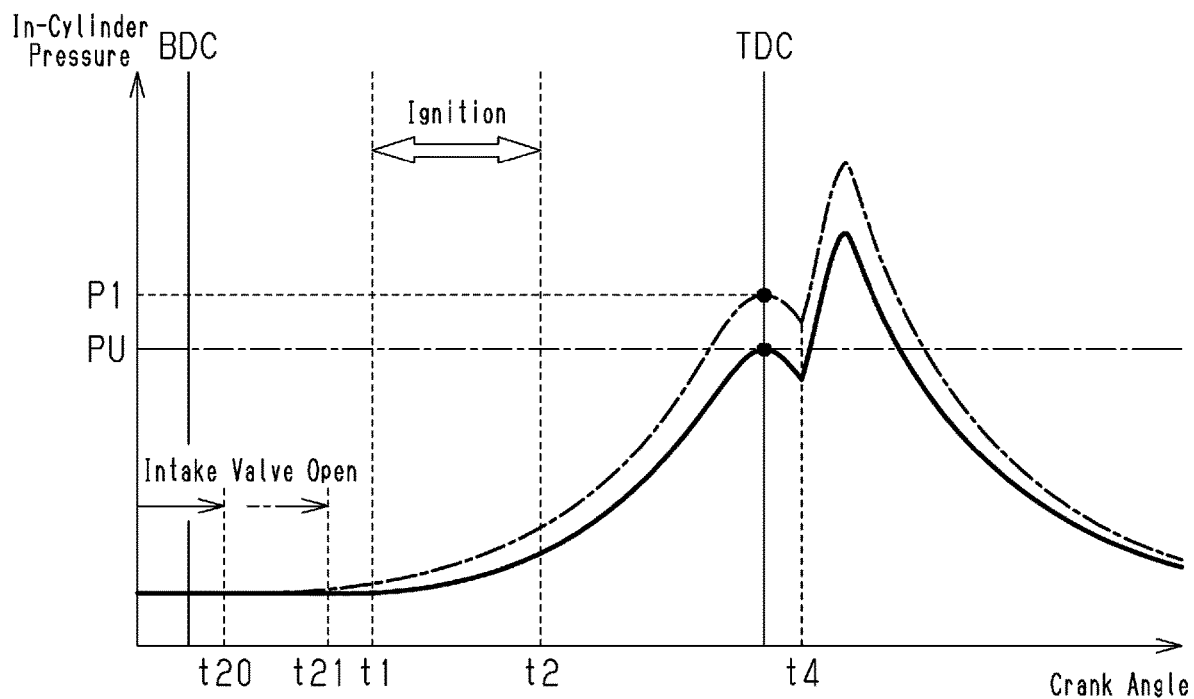
FIG. 5 is a graph showing changes in the in-cylinder pressure between a case in which the closing timing of the intake valve is delayed and a case in which the closing timing of the intake valve is not decreased.

FIG. 3 shows solid lines an example of changes in the in-cylinder pressure in the case of the present embodiment. In FIG. 3, the long-dash short-dash line shows an example of changes in the in-cylinder pressure in a case of a comparative example of a controller that does not perform the hydrogen embrittlement limiting control. The symbol TDC in FIGS. 3 to 5 represents the compression top dead center.

In the case of FIG. 3, the hydrogen gas is injected during the compression stroke from time t1 to time t2. In the comparative example, ignition is performed at time t4, which is subsequent to the compression top dead center. In this case, the in-cylinder pressure increases until the compression top dead center and decreases from the compression top dead center to time t4, at which ignition is performed. Thus, in this case, the in-cylinder pressure before ignition is maximized at the compression top dead center. In this case, the value P1 of the in-cylinder pressure at the compression top dead center is greater than the upper limit value PU. As described above, the upper limit value PU represents the in-cylinder pressure in a case in which the hydrogen partial pressure in the combustion chamber 15 is an upper limit that limits the progress of hydrogen embrittlement of a metal component. Thus, in this case, the hydrogen embrittlement of the metal component around the combustion chamber 15 cannot be sufficiently limited.

In the hydrogen engine 10 in the current control content causes the peak value P of the in-cylinder pressure before ignition to exceed the upper limit value PU, the ECM 30 performs the advancement correction of the ignition timing. In the case of FIG. 3, the ECM 30 advances the ignition timing to time t3, which is a point prior to the compression top dead center. After ignition, the hydrogen in the combustion chamber 15 is burned. Thus, the peak value of the hydrogen partial pressure in the combustion chamber 15 is lower than that in the comparative example. Further, in the present embodiment, the ECM 30 executes the advancement correction of the ignition timing such that the peak value P becomes less than or equal to the upper limit value PU. Thus, the hydrogen partial pressure in the combustion chamber 15 is limited to less than or equal to an upper limit value that limits the progress of hydrogen embrittlement of a metal component within an allowable range.

The present embodiment has the following advantages.

(1) When the metal component is exposed to the atmosphere containing hydrogen gas, the higher the pressure, the more easily the hydrogen enters the metal component. Since the hydrogen gas in the combustion chamber 15 is burned after ignition, the timing at which the hydrogen partial pressure in the cylinder is maximized is earlier than the ignition timing or the ignition timing. Thus, the peak value of the in-cylinder pressure before ignition is lowered to limit the progress of hydrogen embrittlement in the metal component. In this respect, in the present embodiment, the ECM 30 first calculates the peak value P of the in-cylinder pressure before ignition based on the operating state of the hydrogen engine 10. When the peak value P exceeds the upper limit value PU, the ECM 30 changes the control content of the hydrogen engine 10 so that the peak value P becomes less than or equal to the upper limit value PU. More specifically, the ECM 30 changes the control contents to advance the ignition timing such that the ignition timing is advanced to a point prior to the compression top dead center. This limits an increase in the hydrogen partial pressure in the combustion chamber 15. This reduces the hydrogen embrittlement in the metal component around the combustion chamber.

(2) The ECM 30 sets the upper limit value PU to the in-cylinder pressure in which the hydrogen partial pressure in the combustion chamber 15 is a preset allowable upper limit value. Therefore, the hydrogen partial pressure in the combustion chamber 15 is controlled not to exceed a limit that limits the progress of hydrogen embrittlement.

Modifications

The present embodiment may be modified as follows. The present embodiment and the following modifications can be combined as long as they remain technically consistent with each other.

Change in Control Content (1)

In the above-described embodiment, the ECM 30 executes the advancement correction of the ignition timing as a change in the control content for setting the peak value P to be less than or equal to the upper limit value PU in the hydrogen embrittlement limiting control. Instead, the peak value P may be less than or equal to the upper limit value PU by a change in the control content.

FIG. 4 shows solid lines an example of changes in the in-cylinder pressure in a modified example of the controller. In this modified example, the retardation correction of the injection timing of hydrogen gas is performed as a change in the control content for setting the peak value P to the upper limit value PU or less. In FIG. 4, the long-dash short-dash line shows an example of changes in the in-cylinder pressure in a case of a comparative example of a controller that does not perform the hydrogen embrittlement limiting control. In the comparative example, hydrogen gas is injected during the compression stroke from time t1 to time t2. Then, ignition is performed at time t4, which is after the compression stroke. In this case, the in-cylinder pressure before ignition is maximized at the compression top dead center. The value P1 of the in-cylinder pressure at the compression top dead center in this case is greater than the upper limit value PU.

In this modification, the ECM 30 retards the fuel injection timing such that the end timing of the injection is more retarded than the compression top dead center. In the case of FIG. 4, the fuel injection timing is retarded to inject hydrogen gas from time t11 to time t12. In this case, time t12, which is the end time of the injection, is later than the compression top dead center. In such a case, the amount of hydrogen gas present in the combustion chamber 15 at the point in time of the compression top dead center is less than that in the case of the comparative example. At time t12, at which the fuel injection ends, the piston 12 has fallen below the compression top dead center. Thus, even if the fuel injection timing is retarded such that the end timing of the injection is later than the compression top dead center, the peak value P can be set to the upper limit value PU.

When the fuel injection timing is retarded, the time from the end of the injection to the ignition is shortened, and the hydrogen gas may not be sufficiently stirred in the intake air until the ignition is performed. In this case, the ignition timing is preferably retarded with the fuel injection timing. In the case of FIG. 4, the ignition timing is retarded from time t4 to time t5.

Change in Control Content (2)

In the hydrogen embrittlement limiting control, the ECM 30 may change the control content by setting the timing of closing the intake valve 18 to be later than the timing prior to the change in the control content.

FIG. 5 shows a solid line an example of changes in the in-cylinder pressure in a modified example of the control device that changes the valve closing timing of the intake valve 18. In FIG. 5, the long-dash short-dash line shows an example of changes in the in-cylinder pressure in a case of a comparative example of a controller that does not perform the hydrogen embrittlement limiting control. In FIG. 5, BDC represents the intake bottom dead center.

In the case of the comparative example, the intake valve 18 is closed at time t20, which the intake bottom dead center is reached. Then, the hydrogen gas is injected during the subsequent compression stroke from time t1 to time t2. Further, in the case of the comparative example, ignition is performed at time t4, which is after the compression top dead center. In this case, the in-cylinder pressure before ignition is maximized at the compression top dead center. The value P1 of the in-cylinder pressure at the compression top dead center in this case is greater than the upper limit value PU.

In this modification, the ECM 30 operates the VVT 21 to reduce the timing of closing the intake valve 18. In the case of FIG. 5, the timing of closing the intake valve 18 is retarded to time t21, which is later than time t20. In this modification, the fuel injection timing and the ignition timing are the same as those in the comparative example. When the timing of closing the intake valve 18 is retarded relative to the bottom dead center by a certain amount, some of the intake air drawn into the combustion chamber 15 is blown back to the intake passage 19. As the intake air that has been blown back decreases, the intake air filling factor n of the combustion chamber 15 decreases. This consequently decreases the peak value P of the in-cylinder pressure before ignition. Thus, by changing the control content so that the timing of closing the intake valve 18 is more delayed than a point prior to the change in the control content, the peak value P can be set to the upper limit value PU. In the same manner, when the intake air filling factor n is decreased by reducing the open degree of the throttle valve 20, the peak value P can be set to the upper limit value PU or less.

Other Modifications

In the above-described embodiment, the ECM 30 calculates, based on the air excess ratio λ, the in-cylinder pressure, in which the hydrogen partial pressure in the combustion chamber is a specified allowable upper limit value, and sets the upper limit value PU to the calculated value. The upper limit value PU may be a fixed value. For example, when the injection amount of hydrogen gas is the maximum value in the control range, the upper limit value PU may be set to a cylinder internal pressure in which the hydrogen partial pressure in the combustion chamber 15 is the allowable limit value.

The hydrogen embrittlement limiting control of the above embodiment may be applied to a hydrogen engine that does not include the VVT 21 as long as the retardation correction is not performed on the timing of closing the intake valve 18 in the control. Further, the hydrogen embrittlement limiting control of the above embodiment may be applied to a hydrogen engine that injects hydrogen gas into the intake passage 19 as long as the fuel injection timing is not retarded in the control.

The processor 31, which is a controller for the hydrogen engine 10, is not limited to a device that includes a CPU and a ROM and executes software processing. For example, at least part of the processes executed by the software in the above embodiment may be executed by hardware circuits (such as ASIC) dedicated to executing these processes. That is, the processor 31 may be modified to have any one of the following configurations (a) to (c). (a) a configuration including a processor that executes all of the above processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. There may be multiple software execution devices, each including a processor and a program storage device, and multiple dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for a hydrogen engine that uses hydrogen gas as fuel, the controller comprising a processor configured to:
   calculate a peak value of an in-cylinder pressure before ignition based on an operating state of the hydrogen engine;
   set an upper limit value of the in-cylinder pressure before ignition to the in-cylinder pressure in which a hydrogen partial pressure in a combustion chamber is a specified allowable limit value; and
   when the peak value is greater than the upper limit value, change a control content of the hydrogen engine such that the peak value becomes less than or equal to the upper limit value.

2. The controller according to claim 1, wherein the processor is configured to advance, as a change in the control content, an ignition timing to be a point prior to a compression top dead center.

3. The controller according to claim 1, wherein
   the hydrogen engine includes an injector that injects the hydrogen gas into a cylinder, and
   the processor is configured to retard, as a change in the control content, an injection timing of the hydrogen gas such that an end timing of injection is later than a compression top dead center.

4. The controller according to claim 1, wherein
   the hydrogen engine includes a variable valve timing mechanism that varies a timing of opening and closing an intake valve, and
   the processor is configured to set, as a change in the control content, a timing of closing the intake valve to be later than a point before changing the control content.

5. The controller according to claim 2, wherein
   an injection timing is defined as a timing at which the hydrogen gas is injected into the combustion chamber, and
   the processor is configured to execute an advancement correction of the injection timing as well as an advancement correction of the ignition timing when the peak value is greater than the upper limit value.

6. The controller according to claim 5, wherein the processor is configured to calculate the peak value of the in-cylinder pressure before ignition based on an intake air filling factor, an intake air temperature, an atmospheric pressure, the ignition timing, the injection timing, and an injection amount of the hydrogen gas.

7. The controller according to claim 1, wherein the processor is configured to:
- calculate a hydrogen molar ratio of an air-fuel mixture in the combustion chamber based on an air excess ratio;
- divide the allowable limit value by the hydrogen mole ratio; and
- calculate the value obtained by dividing the allowable limit value as the upper limit value.

8. The controller according to claim 6, wherein the processor is configured to:
- calculate a hydrogen molar ratio of an air-fuel mixture in the combustion chamber based on an air excess ratio; and
- divide the allowable limit value by the hydrogen mole ratio and calculate the value obtained by dividing the allowable limit value as the upper limit value.

* * * * *